United States Patent [19]

Pollard

[11] Patent Number: 5,689,490

[45] Date of Patent: Nov. 18, 1997

[54] MO CARTRIDGE JUKEBOX DOORS WHICH OPEN IN A PLANE PARALLEL TO THE FRONT PANEL OF THE JUKEBOX

[75] Inventor: Christopher Anthony Pollard, Monument, Colo.

[73] Assignees: Sony Corporation, Tokyo, Japan; Sony Electronics Inc., Park Ridge, N.J.

[21] Appl. No.: 598,205

[22] Filed: Feb. 6, 1996

[51] Int. Cl.$^6$ ............................................. G11B 33/02
[52] U.S. Cl. ................................. 369/77.2; 369/75.1
[58] Field of Search ........................ 369/75.1, 75.2, 369/77.1, 77.2; 360/96.5, 97.02; 312/301, 321.5, 329; 49/119, 122, 386, 435

[56] References Cited

U.S. PATENT DOCUMENTS

| 5,355,358 | 10/1994 | Van Alfen | 369/77.1 |
| 5,532,996 | 7/1996 | Okabe et al. | 369/77.2 |

*Primary Examiner*—Stuart S. Levy
*Assistant Examiner*—George J. Letscher
*Attorney, Agent, or Firm*—Limbach & Limbach L.L.P.

[57] ABSTRACT

A MO cartridge jukebox cartridge door and closure mechanism which employs a pair of parallel door panels and a pair of parallel cranks all connected together to form a parallelogram which is moved by engagement with a mechanical linkage to the cartridge receiving tray within the jukebox to expand and thereby open a cartridge insertion slot in the jukebox, or contract and thereby close the insertion slot.

10 Claims, 5 Drawing Sheets

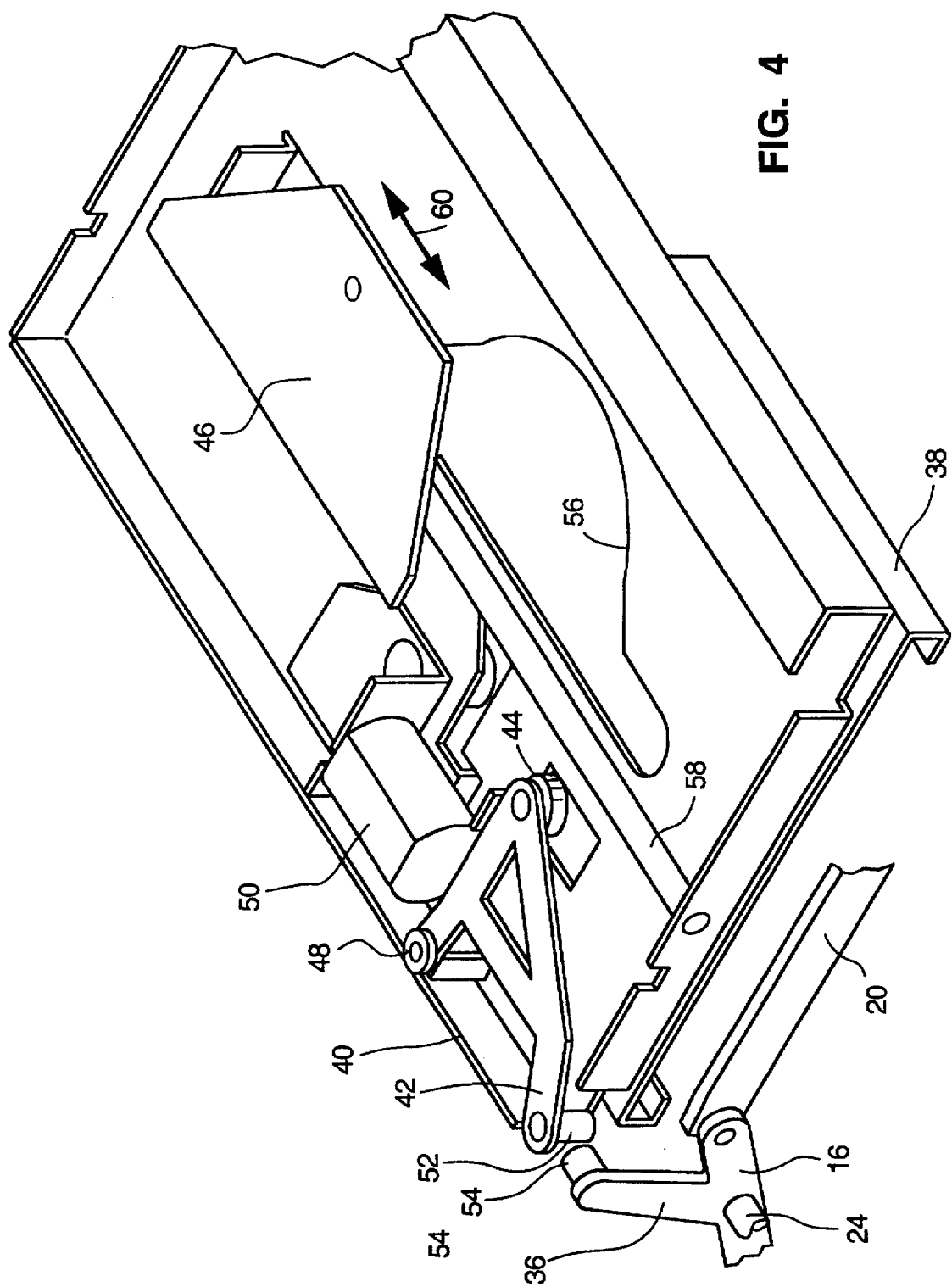

5,689,490

1

MO CARTRIDGE JUKEBOX DOORS WHICH OPEN IN A PLANE PARALLEL TO THE FRONT PANEL OF THE JUKEBOX

TECHNICAL FIELD

This invention relates to a magneto-optic (MO) cartridge jukebox and more particularly to a door and door opening mechanism for closing the cartridge entrance slot in such an MO cartridge jukebox.

BACKGROUND ART

In present large-scale optical disk storage and retrieval systems, popularly called jukebox systems because of their resemblance in operation to phonograph jukeboxes, each MO cartridge disk is installed in a separate, square shaped cartridge. Each cartridge is installed into the storage system via a slot in a cover of the housing of the system. The cartridge is received through the slot into a movable tray. The tray transports the cartridge to a position within the jukebox system for later retrieval and loading onto a disk drive mechanism.

Because the MO cartridges contain enormous amounts of information which are read optically, it is important to preserve a dust free atmosphere within the housing for the system. For that reason, doors are provided to cover the cartridge entrance slot to the system housing. Also when the entrance slot is open, there is a hole which may present a safety issue. At the same time, it is desirable that power consumption for motors and operative mechanical devices be minimized, thus it is desired to have a mechanism for opening and closing the cartridge entrance slot door with a minimum of force.

Prior art devices of this type typically employ a single door which is hinged along one long edge and which must rotate so that the door is repositioned so that its width is parallel to the direction of insertion of the media cartridge. This arrangement consumes unnecessary space. Moreover, it is relatively easy to force such doors open by accident by manual insertion of the media cartridge, potentially causing damage to the mechanism.

SUMMARY OF THE INVENTION

The foregoing and other objects are achieved by the present invention of a door and a door closure mechanism for an insertion slot of a media reproducing device of the type having a housing, an insertion slot opening in the housing, and a tray for receiving a media cartridge, e.g. a MO cartridge, inserted into the insertion slot opening. The door closure mechanism includes a first crank and a second crank rotatably mounted to the housing at opposite ends of the insertion slot opening, each of the first crank and the second crank being in the form of an elongated strip which is rotatable about its center, and a first door panel and a second door panel which are pivoted at their opposite ends to opposite ends of the first crank and the second crank, respectively, to form a parallelogram whose width and length vary as the first crank and the second crank are rotated about their centers. The first door panel and the second door panel are positioned juxtaposed to the insertion slot so that when the parallelogram formed by the first door panel, the second door panel, the first crank and the second crank has a minimal width so that first door panel and the second door panel have contacting long edges, the insertion slot opening is closed and when the parallelogram so formed is at its maximum width, the insertion slot opening is open to

2 receive a media cartridge. A cam and crank assembly is moved by the tray for rotating the first crank about its center as the tray moves toward the insertion slot opening to thereby maximize the width of the parallelogram and open the insertion slot opening and for rotating the first crank about its center as the tray moves away from the insertion slot opening to thereby minimize the width of the parallelogram and close the insertion slot opening.

In the preferred embodiment, the first door panel and the second door panel have overlapping edges which mate to form a seal when the width of the parallelogram is minimized. The first crank includes an extending arm and the cam and crank assembly includes a bell crank which engages with the extending arm and which has a first cam surface which engages with a second cam surface on the tray. A pair of springs are mounted at opposite ends of the insertion slot opening between the housing and the first crank and the second crank, respectively, to normally bias the first crank and the second crank to rotate in a direction which minimizes the width of the parallelogram.

By having two, parallel doors which move in a plane perpendicular to the direction of loading of the media cartridge, a minimum of space is required.

The springs are arranged so that their moment arms are reduced as the springs are extended during opening of the insertion slot to thereby minimize the torque required on the first crank.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 4 is an enlarged isometric view, with portions broken away, of the tray and carriage for receiving and transporting the MO cartridge and a portion of one of the door panels and the first crank.

BEST MODE OF CARRYING OUT THE INVENTION

Figure 1:
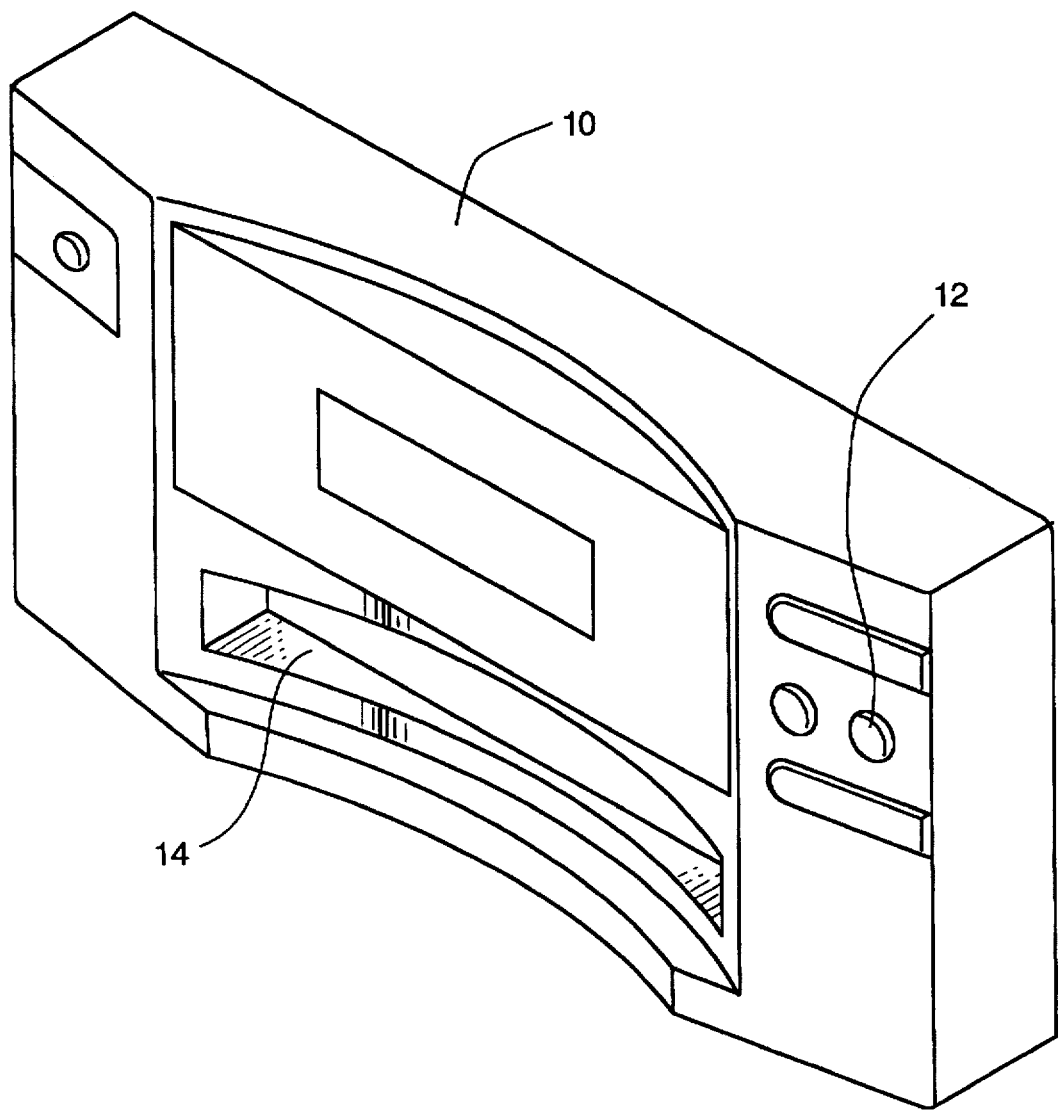
FIG. 1 is isometric front view of the front panel of a MO cartridge jukebox according to the present invention.

Referring now more particularly to FIG. 1, a cover 10 of a MO cartridge jukebox (not shown) is shown. The cover, in addition to having various controls 12 for the MO cartridge jukebox, also has an insertion slot opening 14 for receiving a MO cartridge (not shown) for insertion into the housing 10.

Figure 2:
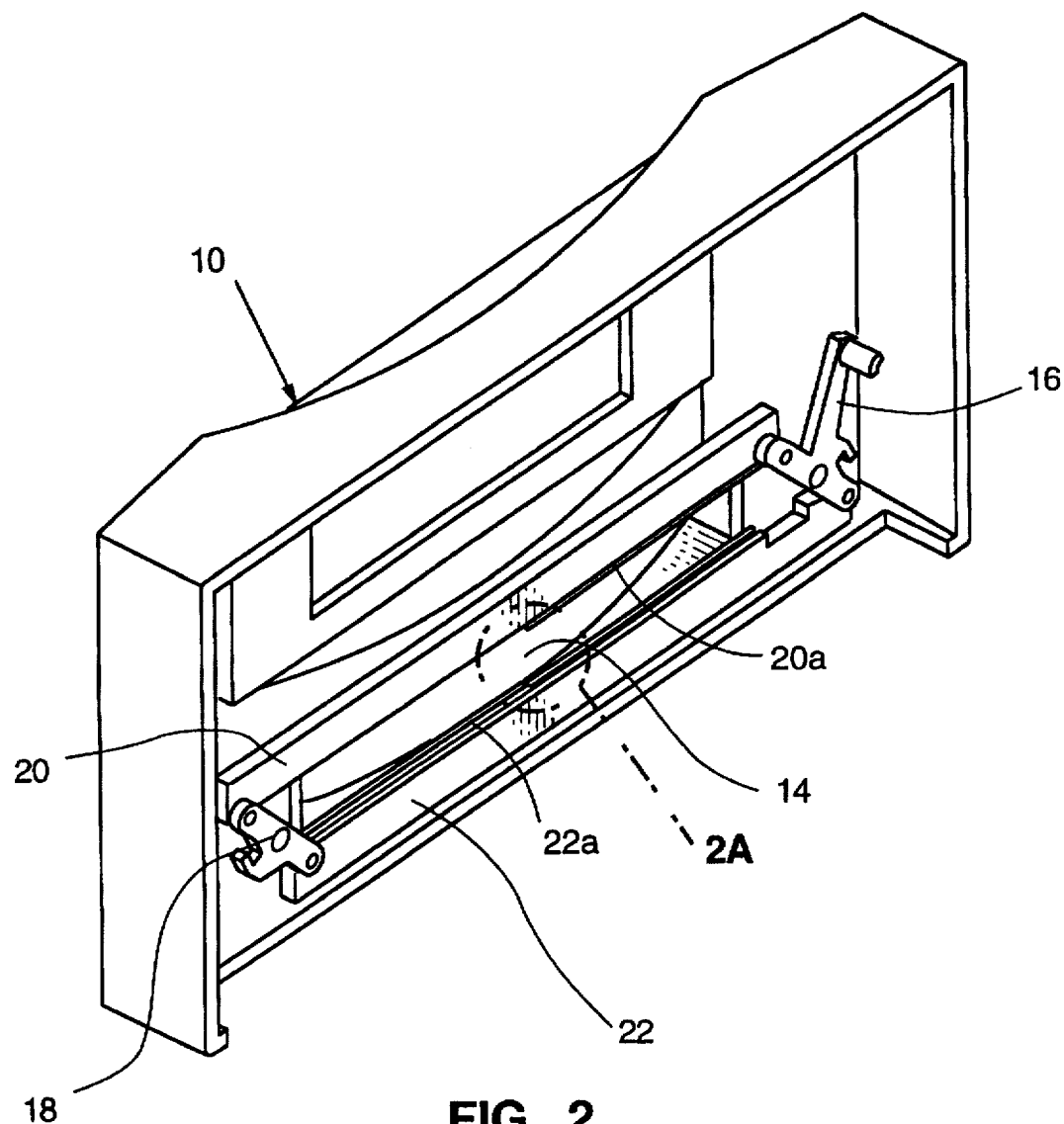
FIG. 2 is a isometric rear view of the front panel depicted in FIG. 1.
Figure 3:
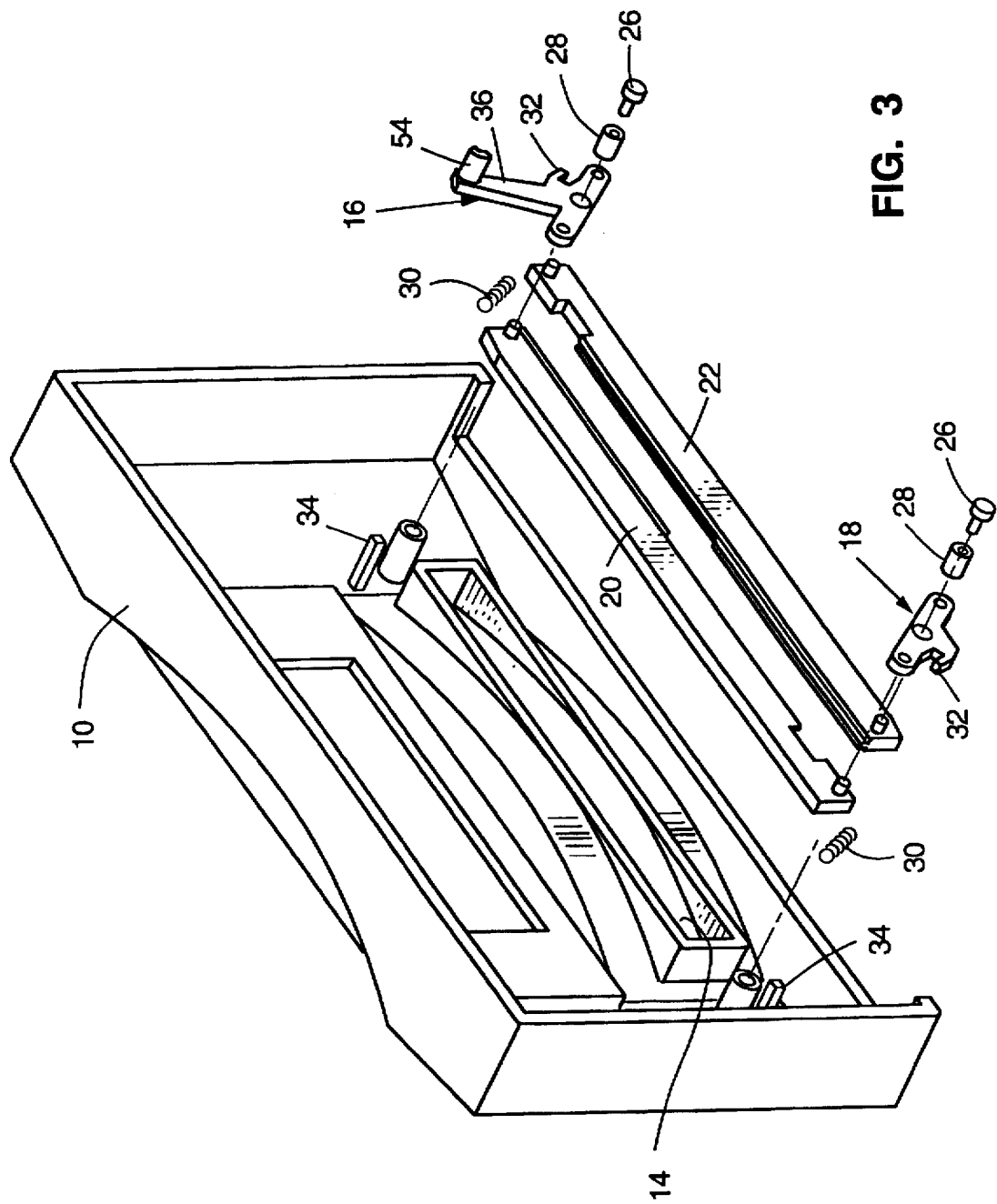
FIG. 3 is an exploded, isometric, rear view of the front panel depicted in FIG. 1.

Referring now more particularly to FIGS. 2 and 3, from the rear side of the cover 10 the door mechanism can be more clearly seen with the insertion slot open. A first crank 16 and a second crank 18 are rotatably mounted to the housing 10 at opposite ends of the insertion slot opening 14.

Each of the first crank 16 and the second crank 18 are in the form of an elongated strip which is rotatable about its center.

An elongated first door panel 20 and an elongated second door panel 22 are pivoted at their opposite ends to opposite ends of the first crank 16 and the second crank 18, respectively, to form a parallelogram whose width and length vary as the first crank 16 and the second crank 18 are rotated about their centers, as will be explained in greater detail in reference to FIGS. 5A–6B.

The first door panel 20 and the second door panel 22 are positioned juxtaposed to the insertion slot opening 14 so that when the parallelogram formed by the first door panel 20, the second door panel 22, the first crank 16 and the second crank 18 has a minimal width, i.e. the first door panel 20 and the second door panel 22 have contacting long edges, the insertion slot opening 14 is closed. This will occur if the first crank 16, as viewed in FIGS. 2 and 3, is rotated in the counterclockwise direction. When the cranks 16 and 18 are rotated in the clockwise direction, so that the width of the parallelogram is at a maximum as seen in FIGS. 2 and 3, the insertion slot opening 14 is open to receive a media cartridge.

Figure 2A:
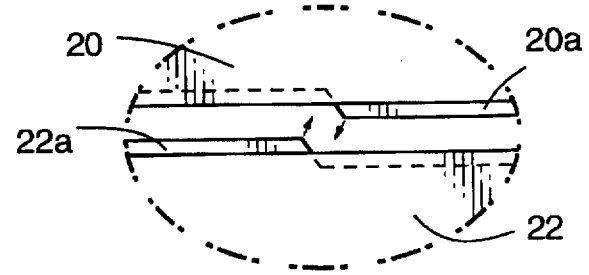
FIG. 2A is an enlarged detail of FIG. 2.

As best seen in the enlarged detail of FIG. 2A, the first door panel 20 and the second door panel 22 have symmetrically overlapping tongue and groove edges 20a and 22a, respectively, which mate to form a seal when the width of the parallelogram is minimized, i.e. when the insertion slot opening is closed by the door panels 20, 22. In addition to acting as a seal, the tongue and groove edges add rigidity to the closed door.

Stanchions 24 extending from the housing cover 10 at opposite ends of the insertion slot opening 14 support the door assembly. A separate screw 26 inserted through a separate bushing 28 and screwed into the projecting end of each of the stanchions 24 pivots each of the cranks 16 and 18 to the housing. The bushings 28 are inserted in enlarged holes in the cranks 16 and 18 to reduce friction.

A pair of springs 30 are mounted at opposite ends of the insertion slot opening 14 between the housing 10 and separate ones of the first crank 16 and the second crank 18 to normally bias the first crank 16 and the second crank 18 to rotate in a direction which minimizes the width of the parallelogram. Each of the first crank 16 and the second crank 18 has a protrusion 32 near the pivot point on the stanchion 24. A second stanchion 34, having an L-shaped cross-section, extends from the housing cover 10 at a point above the stanchion 24 on which the first crank 16 is mounted and below the stanchion 24 on which the second crank 18 is mounted, as viewed in FIG. 3. One end of the spring 30 is attached to the second stanchion 34 and the other end of the spring 30 is attached to the protrusion 32 of each crank.

The locations of the protrusions 32 and the stanchions 24 and 34 are such that the moment arms of the springs 30 are reduced as the springs 30 are extended during opening of the insertion slot 14 to thereby minimize the torque required on the first crank 16.

Referring now more particularly to FIG. 4, the means by which the door panels 20 and 22 are opened and closed is shown. A roller cam 44 on a bell crank 42 is engaged by a plate 46 attached to a tray 38 for rotating the first crank 16 about its center as the tray 38 moves toward the insertion slot opening 14 to thereby maximize the width of the parallelogram and open the insertion slot opening 14.

In more detail, the tray 38 is supported on a shaft 58 mounted on a carriage 40 for reciprocal sliding movement in the direction of the arrow 60, i.e. toward and away from the insertion slot opening 14. The tray 38 receives a media cartridge inserted through the insertion slot opening 14 and then withdraws into the MO cartridge jukebox housing to reposition the media cartridge, as for example described in the Applicant's U.S. Pat. No. 5,375,113 issued Dec. 9, 1994, and entitled "OPTICAL DISK STORAGE TRAY HAVING MULTIPLE STORAGE SITES AND CORRESPONDING DRIVE COMPONENTS," the details of which are incorporated herein by reference. The tray is driven by a motor assembly 50. Note that the plate 46 is mechanically connected through an opening 56 in the carriage 40 to the tray 38 on the opposite side of the carriage 40.

Figure 5A:
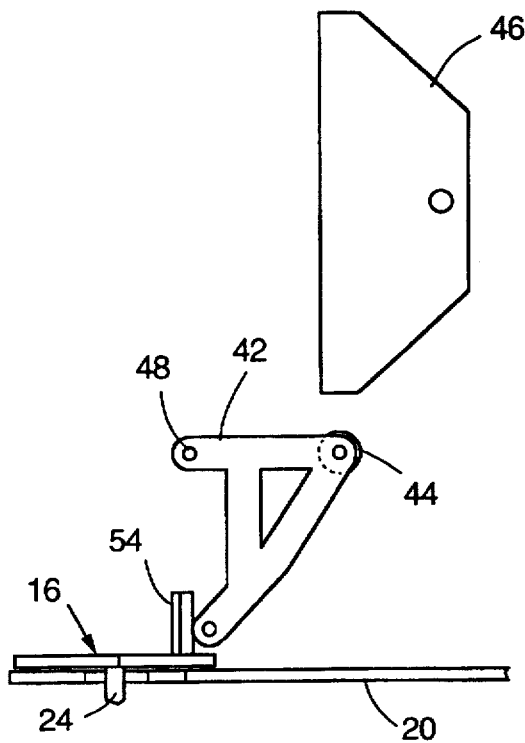
FIGS. 5A and 5B are horizontal, diagrammatic views for explaining the operation of the door mechanism.
Figure 6A:
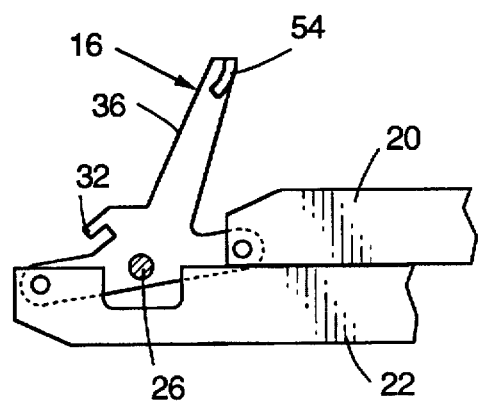
FIGS. 6A and 6B are vertical, diagrammatic views, which correspond to FIGS. 5A and 5B, respectively, for explaining the operation of the door mechanism.
Figure 5B:
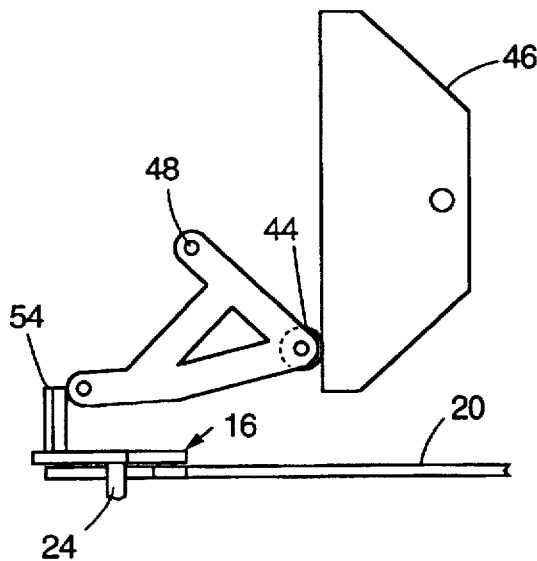
Figure 6B:
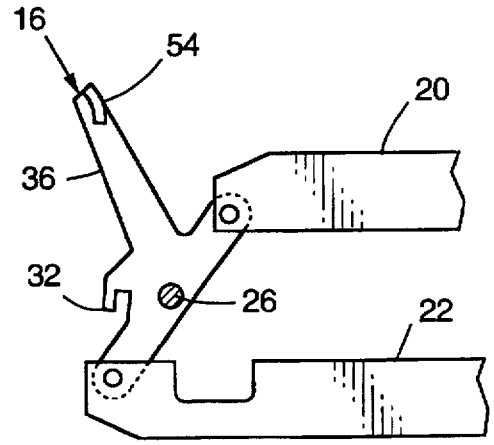

As best seen in FIGS. 5A and 5B, as the plate 46 is moved toward the insertion slot opening 14, a leading edge of the plate 46 engages the roller cam 44 and rotates the bell crank 42 about a pivot point 48 on the carriage 40. It will be noted in FIG. 5B, that the plate 46 is able to slide past the roller cam 44 at the furthermost extent of its travel. The engagement of the plate 46 with the roller cam 44 causes the bell crank 42 to rotate clockwise, as viewed in FIGS. 4–6B.

The bell crank 42 has a boss 52 which engages with a boss 54 on an arm 36 which extends from the crank 16. Rotation of the bell crank 42 in the clockwise direction as viewed in FIGS. 4–6B rotates the crank 16 in a clockwise direction (but in a plane which is orthogonal to the plane of rotation of the bell crank 42). As the crank 16 rotates clockwise, as viewed in the FIGS. 2, 3, the door panels 20 and 22 are moved farther apart, i.e. the width of the parallelogram formed of the cranks 16, 18 and the door panels 16, 18, is increased to open the insertion slot opening 14. When the plate 46 is withdrawn to its original position shown in FIG. 4, the force of the springs 30 causes the crank 16 to rotate in the counterclockwise direction and position the door panels 16 and 18 adjacent each other and the bell crank 42 returns to its original position.

Although the present invention has been shown and described with respect to a preferred embodiment, many others are possible according to the present invention. The scope of the present invention is not intended to be limited to the specific embodiment described above but is rather defined by the claims recited below.

What is claimed is:

1. A door closure mechanism for an insertion slot of a media reproducing device of the type having a housing with a front panel, an insertion slot opening in the front panel of the housing, and a tray for receiving a media cartridge inserted into the insertion slot opening, comprising:

a first crank and a second crank rotatably mounted to the housing at opposite ends of the insertion slot opening, each of the first crank and the second crank being in the form of an elongated strip which is rotatable about its center;

a first door panel and a second door panel, wherein the first door panel and the second door panel are pivoted at their opposite ends to opposite ends of the first crank and the second crank, respectively, to form a parallelogram whose width and length vary as the first crank and the second crank are rotated about their centers, the first door panel and the second door panel being positioned juxtaposed to the insertion slot opening so that when the parallelogram formed by the first door panel, the second door panel, the first crank and the second crank has a minimal width so that first door panel and the second door panel have contacting long edges, the insertion slot opening is closed and when the width of the parallelogram so formed is at a maximum, the insertion slot opening is open to receive a media cartridge, wherein the first door panel and the second door panel move in a plane which is parallel to the front panel to open and close the insertion slot opening; and a cam and crank assembly moved by the tray for rotating the first crank about its center as the tray moves toward the insertion slot opening to thereby maximize the width of the parallelogram and open the insertion slot opening and for rotating the first crank about its center as the tray moves away from the insertion slot opening to thereby minimize the width of the parallelogram and close the insertion slot opening.

2. A door closure mechanism according to claim 1, wherein the first door panel and the second door panel have overlapping edges which mate to form a seal when the width of the parallelogram is minimized.

3. A door closure mechanism according to claim 1, wherein the first crank includes an extending arm and the cam and crank assembly includes a bell crank which engages with the extending arm and which has a first cam surface which engages with a second cam surface on the tray.

4. A door closure mechanism according to claim 1, further including a pair of springs mounted at opposite ends of the insertion slot opening between the housing and separate ones of the first crank and the second crank to normally bias the first crank and the second crank to rotate in a direction which minimizes the width of the parallelogram.

5. A door closure mechanism according to claim 4, wherein the springs are arranged so that their moment arms are reduced as the springs are extended during opening of the insertion slot to thereby minimize the torque required on the first crank.

6. A door closure mechanism for an insertion slot of a media reproducing device comprising:

a housing having a front wall and with an insertion slot opening in the front wall;

a tray for receiving a media cartridge inserted into the insertion slot opening;

a first crank and a second crank rotatably mounted to the front wall at opposite ends of the insertion slot opening, each of the first crank and the second crank being in the form of an elongated strip which is rotatable about its center;

a first door panel and a second door panel, wherein the first door panel and the second door panel are pivoted at their opposite ends to opposite ends of the first crank, the first door panel and the second door panel are each pivoted at another end to opposite ends of the second crank, and the first door panel, the second door panel, the first crank, and the second crank form the sides of the parallelogram whose width and length vary as the first crank and the second crank are rotated about their centers, the first door panel and the second door panel being positioned juxtaposed to the insertion slot opening so that when the parallelogram formed by the first door panel, the second door panel, the first crank and the second crank has a minimal width so that first door panel and the second door panel have contacting long edges, the insertion slot opening is closed and when the width of the parallelogram so formed is at a maximum, the insertion slot opening is open to receive a media cartridge, wherein the first door panel and the second door panel move in a plane which is parallel to the front wall to open and close the insertion slot opening; and a cam and crank assembly moved by the tray for rotating the first crank about its center as the tray moves toward the insertion slot opening to thereby maximize the width of the parallelogram and open the insertion slot opening and for rotating the first crank about its center as the tray moves away from the insertion slot opening to thereby minimize the width of the parallelogram and close the insertion slot opening.

7. A door closure mechanism according to claim 6, wherein the first door panel and the second door panel have overlapping edges which mate to form a seal when the width of the parallelogram is minimized.

8. A door closure mechanism according to claim 6, wherein the first crank includes an extending arm and the cam and crank assembly includes a bell crank which engages with the extending arm and which has a first cam surface which engages with a second cam surface on the tray.

9. A door closure mechanism according to claim 6, further including a pair of springs mounted at opposite ends of the insertion slot opening between the housing and separate ones of the first crank and the second crank to normally bias the first crank and the second crank to rotate in a direction which minimizes the width of the parallelogram.

10. A door closure mechanism according to claim 9, wherein the springs are arranged so that their moment arms are reduced as the springs are extended during opening of the insertion slot to thereby minimize the torque required on the first crank.

* * * * *